US007848874B2

(12) United States Patent
Hay et al.

(10) Patent No.: US 7,848,874 B2
(45) Date of Patent: Dec. 7, 2010

(54) CONTROL SYSTEM AND METHOD FOR STARTING AN ENGINE WITH PORT FUEL INJECTION AND A VARIABLE PRESSURE FUEL SYSTEM

(75) Inventors: James D. Hay, Milford, MI (US); Mark D. Carr, Fenton, MI (US); Jeffrey M. Hutmacher, Fowlerville, MI (US); Louis A. Avallone, Milford, MI (US); Jon C. Miller, Fenton, MI (US)

(73) Assignee: GM Global Technology Operations, Inc.

(*) Notice: Subject to any disclaimer, the term of this patent is extended or adjusted under 35 U.S.C. 154(b) by 274 days.

(21) Appl. No.: 12/207,853

(22) Filed: Sep. 10, 2008

(65) Prior Publication Data

US 2009/0216425 A1 Aug. 27, 2009

Related U.S. Application Data

(60) Provisional application No. 61/031,392, filed on Feb. 26, 2008.

(51) Int. Cl.
*G06F 19/00* (2006.01)
*F02M 51/00* (2006.01)

(52) U.S. Cl. ........................ 701/113; 123/491; 123/685

(58) Field of Classification Search ......... 701/101–103, 701/113; 123/295, 305, 453, 478, 491, 685
See application file for complete search history.

(56) References Cited

U.S. PATENT DOCUMENTS

| | | | | |
|---|---|---|---|---|
| 6,668,792 | B2 * | 12/2003 | Yamauchi et al. | 123/295 |
| 6,978,759 | B2 * | 12/2005 | Iriya et al. | 123/295 |
| 7,066,126 | B2 * | 6/2006 | Tokuyasu et al. | 123/179.17 |
| 2005/0028792 | A1 * | 2/2005 | Hosoya et al. | 123/520 |
| 2010/0163004 | A1 * | 7/2010 | Kurata et al. | 123/491 |

FOREIGN PATENT DOCUMENTS

| | | | |
|---|---|---|---|
| DE | 10058674 | A1 | 6/2002 |

* cited by examiner

*Primary Examiner*—John T Kwon

(57) ABSTRACT

A fuel control system includes a pressure comparison module that generates a pressure control signal when a fuel supply pressure is greater than a predetermined pressure value, a temperature comparison module that generates a temperature control signal when a temperature of an engine is greater than a predetermined temperature value, and a pre-crank fuel module that selectively dispenses pre-crank fuel prior to cranking the engine based on the pressure control signal and the temperature control signal. A related fuel control method is also provided.

17 Claims, 6 Drawing Sheets

CONTROL SYSTEM AND METHOD FOR STARTING AN ENGINE WITH PORT FUEL INJECTION AND A VARIABLE PRESSURE FUEL SYSTEM

CROSS-REFERENCE TO RELATED APPLICATIONS

This application claims the benefit of U.S. Provisional Application No. 61/031,392, filed on Feb. 26, 2008. The disclosure of the above application is incorporated herein by reference.

FIELD

The present disclosure relates to engine control systems for internal combustion engines, and more particularly to control systems and methods for starting the engines.

BACKGROUND

The statements in this section merely provide background information related to the present disclosure and may not constitute prior art.

Internal combustion engines may utilize electronic fuel injection (EFI) to meter fuel to the engine. Common types of EFI systems include manifold injection, port injection, pre-combustion chamber injection, and direct injection. One or more fuel injectors may be utilized to deliver fuel to the engine. Fuel injectors generally include a nozzle located at a tip thereof and a valve. The fuel injectors may be selectively energized to open the valve and atomize the fuel by pumping the fuel through the tip under pressure. For example, power may be supplied to a solenoid to open the valve.

The process of determining and delivering the fuel to the engine at the appropriate time is known as fuel metering. Fuel metering is important to controlling an engine's air-fuel ratio to achieve the desired engine starting and operating performance, emissions, driveability, and fuel economy.

A period of time that the fuel injectors are energized is referred to as a pulse width. Typically, the pulse width for each of the fuel injectors is determined based on a desired quantity (e.g., mass) of fuel, the size of the fuel injectors (i.e. fuel flow capacity), and the pressure of the fuel that will be supplied. To simplify the determination of the pulse width, some systems assume that the fuel injectors provide linear fuel flow over the range of fuel pressures supplied to the fuel injectors. As a practical matter, fuel injectors are typically capable of linear fuel flow over a limited range of fuel pressures.

The number and size of the fuel injectors and the fuel pressure largely depend on the size of the engine and its maximum power output. However, the maximum fuel pressure that can be used is limited by the amount of power available to operate the fuel injectors. The number and size of the fuel injectors is also dependent on the linear flow range of the fuel injectors.

Engines with large displacement and/or high power output may require two or more fuel injectors per cylinder. Implementing such a fuel injection system may require additional engine controllers to drive the additional fuel injectors. The additional controllers may require additional packaging space and wiring. Complicated control methods for turning on and off the additional fuel injectors to obtain the increased fuel flow may also be required. The complexity of such a fuel injection system increases the cost of developing and producing such a system.

SUMMARY

The present disclosure provides a control system and method that may be used to extend the dynamic flow range of fuel injectors used to fuel an engine. In one form, the present teachings provide a fuel control system comprising a pressure comparison module that generates a pressure control signal when a fuel supply pressure is greater than a predetermined pressure value, a temperature comparison module that generates a temperature control signal when a temperature of an engine is greater than a predetermined temperature value, and a pre-crank fuel module that selectively dispenses pre-crank fuel prior to cranking the engine based on the pressure control signal and the temperature control signal.

In another form, the present teachings provide a method of fuel control comprising comparing a fuel supply pressure and a predetermined pressure value, comparing a temperature of an engine and a predetermined temperature value, and dispensing a quantity of pre-crank fuel prior to cranking the engine based on the pressure comparison and the temperature comparison.

In another aspect, the present teachings provide a method of fueling an engine comprising providing a plurality of fuel injectors to dispense fuel to the engine, comparing a pressure of the fuel and a predetermined pressure value, comparing a temperature of the engine and a predetermined temperature value, selecting a number (N) of the plurality of fuel injectors based on positions of a plurality of intake valves of the engine, where N is an integer greater than zero, and operating the N fuel injectors to dispense a quantity of pre-crank fuel prior to cranking the engine based on the pressure comparison and the temperature comparison.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The present disclosure will become more fully understood from the detailed description and the accompanying drawings, wherein.

DETAILED DESCRIPTION

The following description is merely exemplary in nature and is not intended to limit the present disclosure, application, or uses. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Exemplary engine control systems and methods are provided herein that may be used to extend the dynamic flow range of a fuel injection system used for internal combustion engines. The principles of the present disclosure may be implemented in a variable pressure fuel system to enable higher fuel pressures to be supplied to the fuel injection system while the engine is running. The control systems and methods of the present disclosure enable higher running fuel pressures by regulating excessive fuel system pressure that may develop during periods following the operation of the engine commonly referred to as "hot soaks." During a hot soak, auxiliary cooling of the engine is often not provided and heat within the engine causes temperatures surrounding the engine to rise above those which exist during the running of the engine. As a result, the temperature of the fuel in the fuel injection system may rise, which causes the pressure of the fuel in the fuel injection system to rise. The elevated pressures that may develop may exceed the pressure at which the fuel injectors will properly open during subsequent engine cranking. Accordingly, the control systems and methods of the present disclosure may be implemented to reduce the fuel pressures that may develop in the fuel system during a hot soak and ensure proper starting of the engine.

Figure 1:
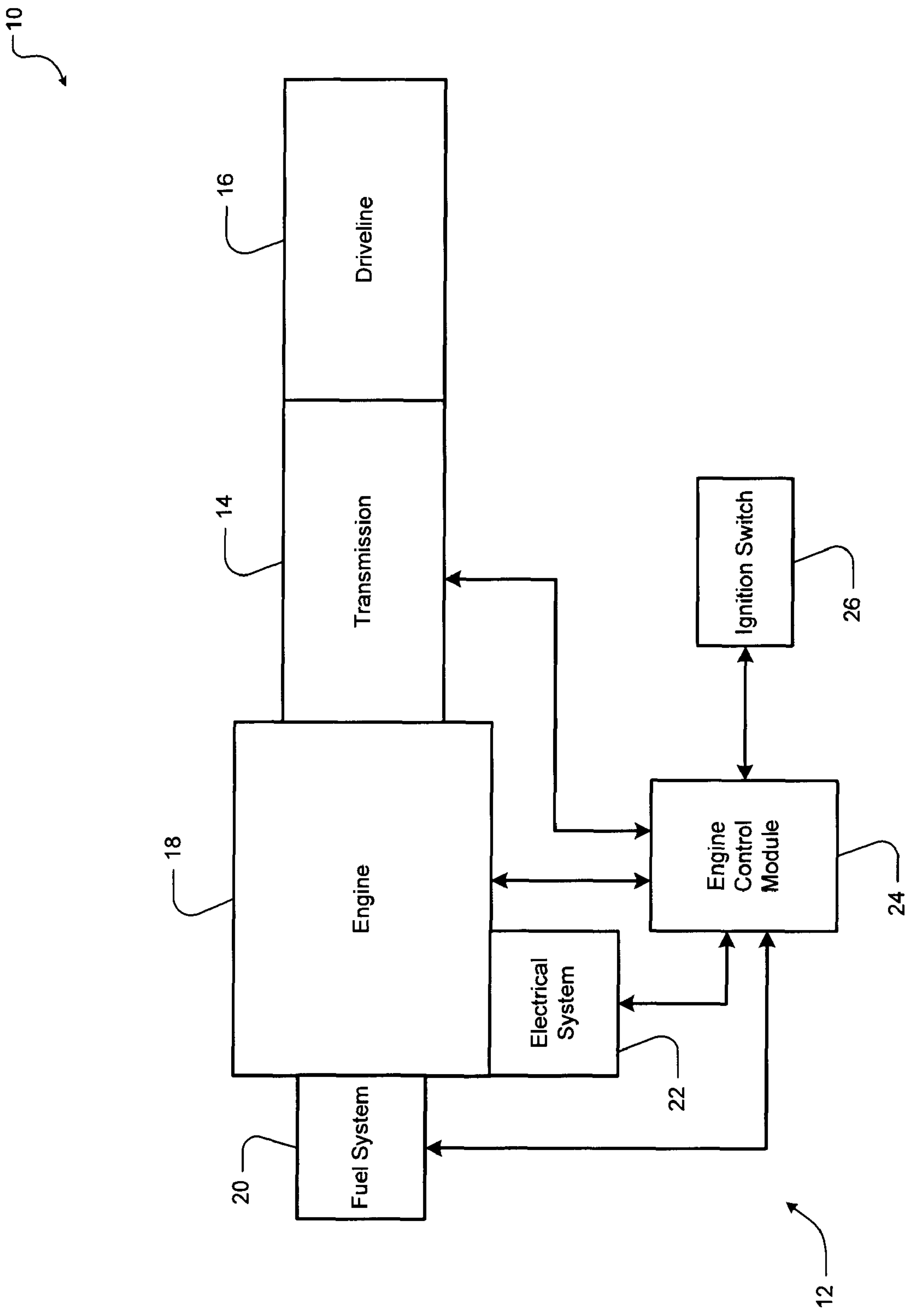
FIG. 1 is a functional block diagram of an exemplary powertrain for a vehicle according to the principles of the present disclosure.

Referring now to FIG. 1, a functional block diagram of the powertrain for a vehicle 10 is shown. The vehicle 10 includes an engine system 12, a transmission 14, and a driveline 16. The engine system 12 produces driving torque that is transferred through the transmission 14 to the driveline 16 to drive at least one pair of wheels (not shown). The engine system 12 includes an internal combustion engine 18, a fuel system 20, an electrical system 22, an engine control module (ECM) 24, and an ignition switch 26. The engine 18 generates driving torque through the combustion of fuel in the presence of an oxidizer (typically air) in a confined space referred to as a combustion chamber. The engine 18 may be of several conventional types commonly used in motorized vehicles. For example, the engine 18 may be a four-stroke engine, a two-stroke engine, or a Wankel engine. As discussed herein and shown in the figures, the engine 18 is a four-stroke engine.

Figure 2:
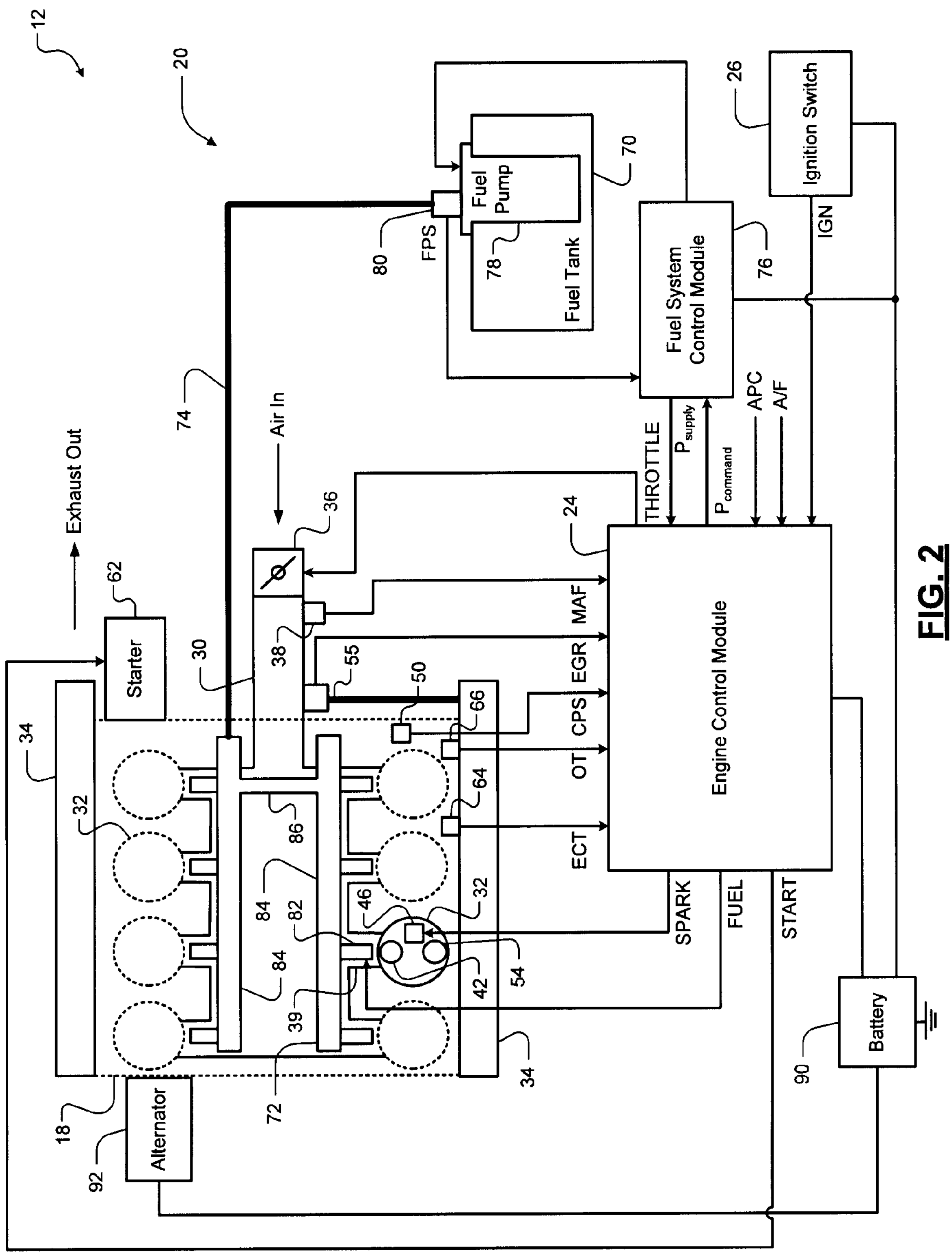
FIG. 2 is a more detailed functional block diagram of the engine system shown in FIG. 1.
Figure 3:
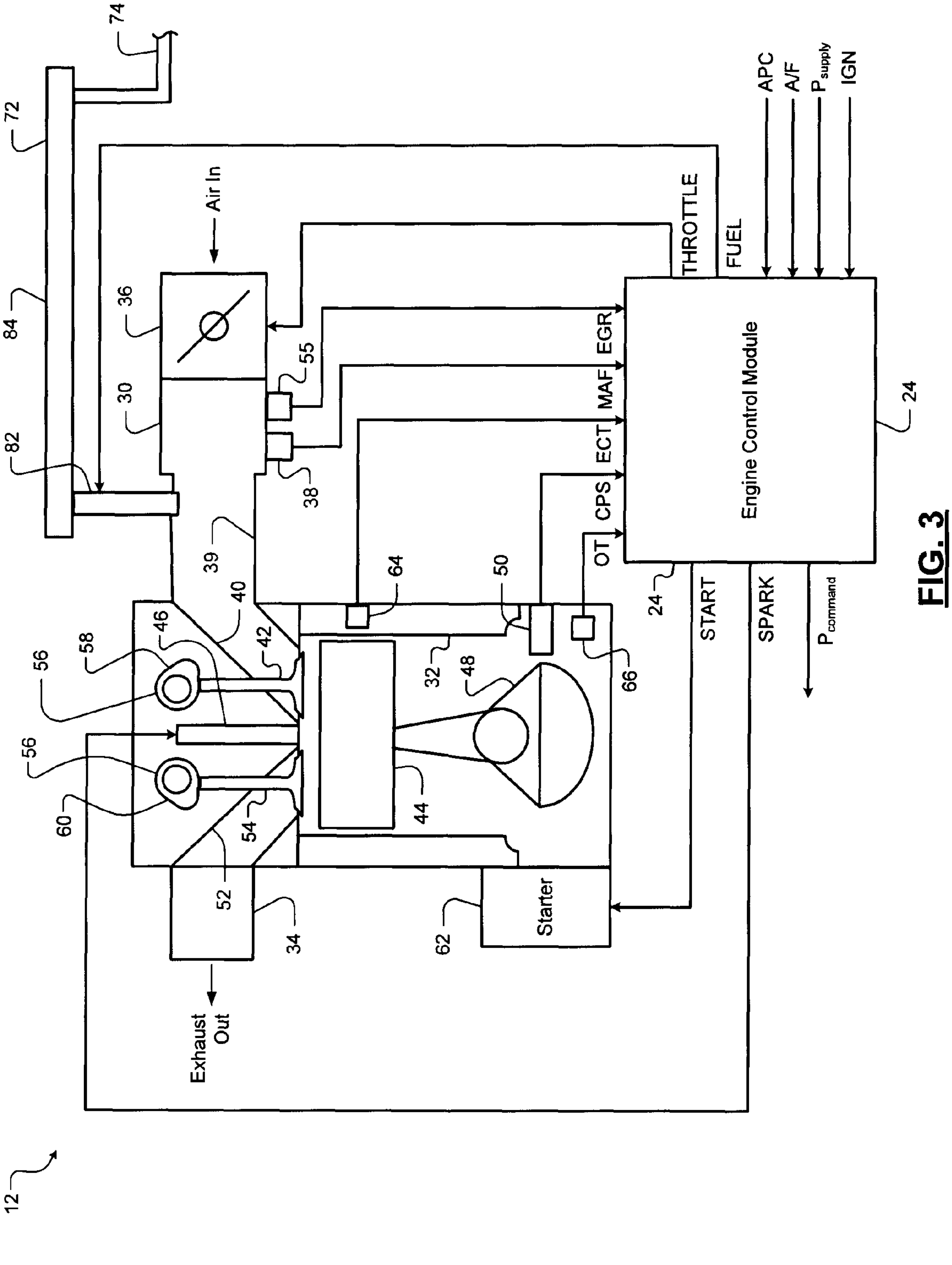
FIG. 3 is a functional block diagram of a portion of the engine system shown in FIG. 2.

Referring now to FIGS. 2-3, the engine 18 includes an intake manifold 30, a plurality of cylinders 32, and an exhaust manifold 34. Air is drawn into the intake manifold 30 through a throttle 36 and a mass air flow (MAF) sensor 38. The throttle 36 regulates the amount of air flow into the intake manifold 30 and may be adjusted by the ECM 24 based on a commanded engine operating point. Alternatively, the throttle 36 may be adjusted based on an operator commanded engine operating point. The MAF sensor 38 is an air flow meter that generates a mass air flow (MAF) signal that may be used to determine the rate of air flowing through the MAF sensor 38. The MAF signal is communicated to the ECM 24, which determines the air flow rate based on the MAF signal.

The intake manifold 30 may include a plurality of intake runners 39 for delivering air within the intake manifold 30 to the cylinders 32. Air entering the intake manifold 30 is distributed among the intake runners 39 and is delivered to the cylinders 32 via a plurality of intake ports 40. The flow of air from the intake ports 40 into the cylinders 32 is controlled by a plurality of intake valves 42. The intake valves 42 sequentially open to allow air into the cylinders 32 and close to inhibit the flow of air into the cylinders 32.

Air in the cylinders 32 is mixed with fuel and the air and fuel mixture is combusted within the cylinders 32 to drive a plurality of piston assemblies 44. A plurality of spark plugs 46 are located within the cylinders 32 to provide the energy necessary to initiate the combustion process. The piston assemblies 44 are connected to a crankshaft 48 that rotates in response to the movement of the piston assemblies 44. The crankshaft 48 rotates at engine speed or at a rotational rate that is proportional to engine speed.

A crankshaft position sensor 50 may be utilized to sense the position of the crankshaft 48. The crankshaft position sensor 50 may generate a crankshaft position (CPS) signal that may be used to determine the position and rotational speed of the crankshaft 48. The CPS signal may be communicated to the ECM 24, which may determine the position of the crankshaft 48 and the rotational speed of the engine 18 based on the CPS signal.

Combusted air within the cylinders 32 is selectively pumped into the exhaust manifold 34 via a plurality of exhaust ports 52 by the piston assemblies 44. The flow of air from the cylinders 32 into the exhaust manifold 34 is controlled by a plurality of exhaust valves 54. Specifically, the exhaust valves 54 sequentially open to allow air to exit the cylinders 32 and close to inhibit air from exiting the cylinders 32. A portion of the exhaust gas within the exhaust manifold 34 may be routed back to the intake manifold 30 via an exhaust gas recirculation (EGR) valve assembly 55. The EGR valve assembly 55 may generate an EGR signal that may be used to determine the amount of exhaust gas recirculation. The EGR signal may be communicated to the ECM 24, which may determine the amount of exhaust gas recirculation based on the EGR signal.

The timing and duration of the opening and closing of the intake and exhaust valves 42, 54 during the operation of the engine 18 may be controlled by a plurality of camshafts 56. The camshafts 56 may have a plurality of lobes 58, 60 engaged with the intake and exhaust valves 42, 54, respectively, to control their operation. The camshafts 56 may be connected to the crankshaft 48 to rotate at a speed proportional to the rotational speed of the crankshaft 48, typically one-half the speed of the crankshaft 48. While two camshafts 56 are illustrated (FIG. 3), a single camshaft having lobes 58, 60 may be provided. It is also contemplated that any other suitable device for selectively operating the intake and exhaust valves 42, 54 may be provided.

The number of cylinders 32 and, thus intake and exhaust ports 40, 52, associated with the engine 18 may vary. For example, the engine 18 may have 4, 5, 6, 10, 12 and 16 cylinders. As discussed herein, the engine 18 has eight cylinders, eight intake ports 40, and eight exhaust ports 52 (FIG. 2). The number of intake and exhaust valves 42, 54 may also vary. Specifically, the number of intake and exhaust valves 42, 54 associated with each of the cylinders 32 may be one or more. As discussed herein, each of the cylinders 32 has corresponding intake and exhaust valves 42, 54 (FIG. 2).

The engine 18 further includes an electric starter 62 coupled to the crankshaft 48. The starter 62 is selectively operable to rotate the crankshaft 48 as may be desired to crank, and thereby start the engine 18.

Heat generated during the operation of the engine 18 may be absorbed by coolant (not shown) flowing through the engine 18 and dissipated by an engine cooling system (also not shown). A coolant temperature sensor 64 may be located in the engine 18 to sense the temperature of the coolant and to generate an engine coolant temperature sensor (ECT) signal. The ECT signal may be used to determine a temperature of the engine 18. The ECT signal may be communicated to the ECM 24, which may determine the temperature of the engine 18 based on the ECT signal.

The engine 18 is lubricated by oil (not shown) that flows through portions of the engine 18. An oil temperature sensor 66 may be located in the engine 18 to sense the temperature of the oil and to generate an oil temperature sensor (OT) signal that may be used to determine the temperature of the oil. The OT signal may be communicated to the ECM 24, which may determine the temperature of the oil based on the OT signal.

Referring still to FIGS. 2-3, the fuel system 20 is selectively operable to deliver a specified quantity of fuel (e.g., gasoline, diesel, ethanol) to the engine 18. The fuel system 20 may include a fuel tank assembly 70 that supplies fuel at a desired pressure to a fuel rail assembly 72 via a fuel supply line 74. The fuel system 20 may further include a fuel system control module 76.

The fuel tank assembly 70 may include a fuel pump 78 fluidly coupled to the fuel supply line 74. The fuel pump 78 may be an electrically-controlled, variable speed fuel pump operable to supply fuel at a desired pressure to the fuel supply line 74. The fuel tank assembly 70 may further include a fuel pressure sensor 80 located at an outlet of the fuel pump 78 proximate the fuel supply line 74 that generates a fuel pressure (FPS) signal. The FPS signal may be communicated to the fuel system control module 76 (see FIG. 3), which may determine a pressure of the fuel supplied by the fuel pump 78 to the supply line 74 ($P_{supply}$) based on the FPS signal.

The fuel system control module 76 may communicate the pressure of the fuel in the supply line 74 ($P_{supply}$) to the ECM 24. The fuel system control module 76 may also control the speed of the fuel pump 78 based on the FPS signal generated by the fuel pressure sensor 80. For example, the fuel system control module 76 may receive a desired fuel pressure signal ($P_{desired}$) from the ECM 24 and may control the speed of the fuel pump 78 to achieve the desired fuel pressure ($P_{desired}$) in the supply line 74.

The desired fuel pressure ($P_{desired}$) may vary based on the engine operating point. For example, the fuel system control module 76 may control the speed of the fuel pump 78 to operate at a first desired fuel pressure during periods when the engine is operated under low power demand. The fuel system control module 76 may further control the speed of the fuel pump 78 to operate at a second desired fuel pressure greater than the first desired fuel pressure during periods when the engine is operated under high power demand.

The fuel rail assembly 72 may selectively deliver a quantity of fuel to the intake manifold 30. The fuel rail assembly may include a plurality of electronic fuel injectors 82 fluidly coupled to a pair of fuel rails 84. The fuel rail assembly 72 may further include a cross-over pipe 86 disposed between the fuel rails 84 to fluidly couple the fuel rails 84.

The number of fuel injectors 82 may vary. As discussed herein, eight fuel injectors 82 are provided. The fuel injectors 82 are selectively operable to deliver a predetermined quantity of fuel to the intake manifold 30. Each of the fuel injectors 82 may be located at a corresponding one of the intake runners 39 (FIG. 2) to dispense fuel within the intake runners 39 and thereby provide fuel to a corresponding one of the cylinders 32. The fuel injectors 82 may be of any conventional type.

The fuel rails 84 may be fluidly coupled to the fuel supply line 74 to supply pressurized fuel supplied by the fuel tank assembly 70 to the fuel injectors 82. While a pair of fuel rails 84 is shown, a single fuel rail may be provided.

With particular reference to FIG. 2, the electrical system 22 provides power to operate the various electrical components associated with the vehicle 10 and may be of any conventional type. For example, the electrical system 22 may include a battery 90 for providing power to the vehicle 10 when the engine 18 is not running or is being started. The electrical system 22 may further include an alternator 92 drivingly coupled to the engine 18 for providing additional power to the vehicle 10 and recharging the battery 90 while the engine is running.

Figure 4:
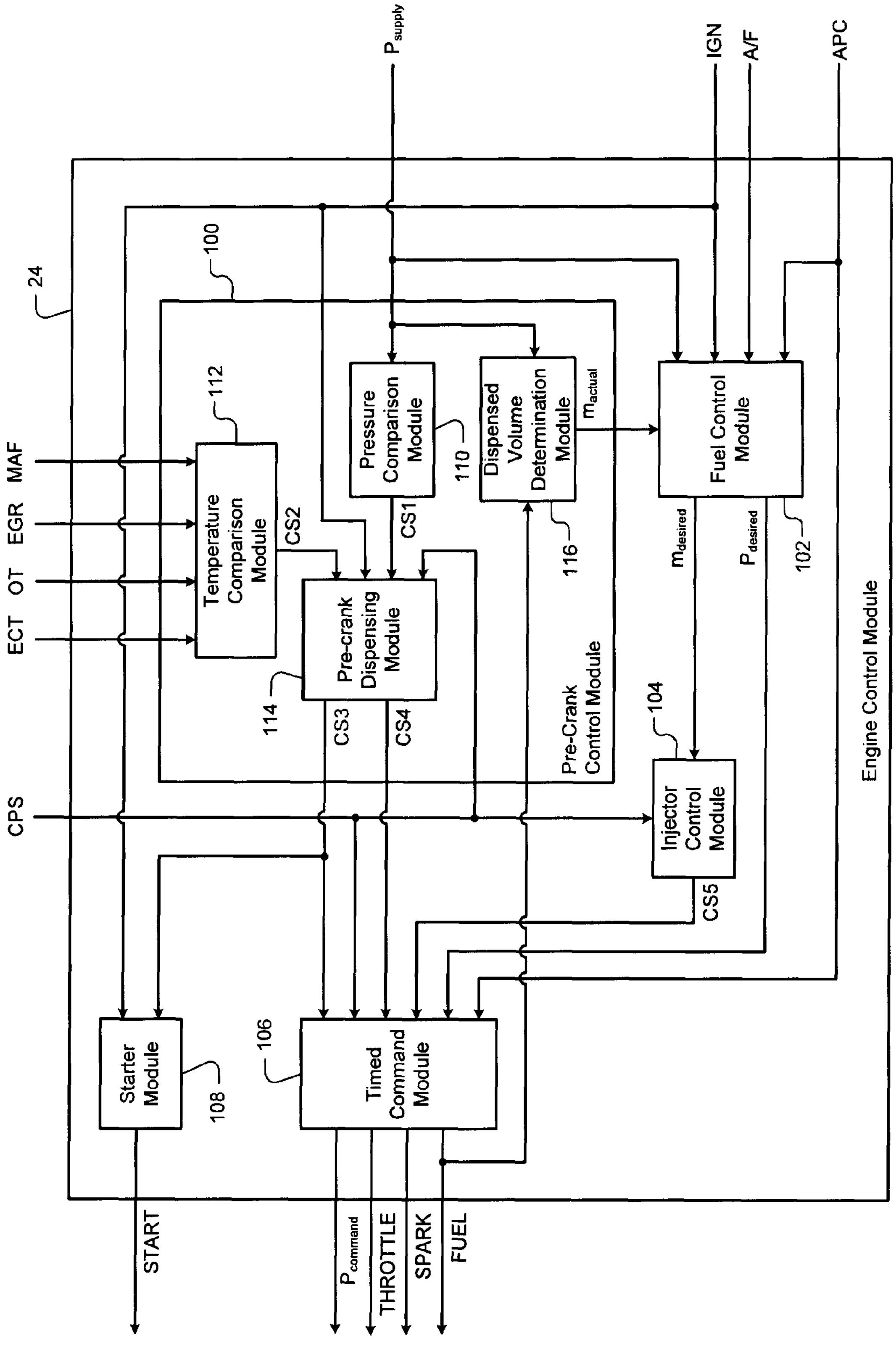
FIG. 4 is a functional block diagram of an engine control module according to the principles of the present disclosure.

Referring now to FIGS. 2-4, the ECM 24 will now be described in detail. The ECM 24 may control the starting and operation of the engine 18. To this end, the ECM 24 may receive and process signals from the ignition switch 26, the engine 18, the fuel system 20, and the electrical system 22. Based on the signals it receives, the ECM 24 may generate timed engine system control commands that are output to the engine 18, the fuel system 20, and the electrical system 22. Specifically, the ECM 24 may receive signals from the engine 18 including, but not limited to, the CPS, EGR, ECT, MAF, and OT signals (hereinafter "engine signals"). The ECM 24 may receive signals from the fuel system 20 including, but not limited to, the FPS signal (hereinafter "fuel system signals"). The ECM 24 may also receive an ignition (IGN) signal generated by the ignition switch 26.

The ECM 24 may store one or more of the engine and fuel system signals in memory for a period of time so that they may be retrieved for subsequent determinations by the ECM 24. Based on the IGN signal, the engine signals, and the fuel system signals, the ECM 24 may generate timed engine and fuel system control commands including, but not limited to, signals that control the throttle 36, the spark plugs 46, the starter 62, the fuel system control module 76, and the fuel injectors 82.

With particular reference to FIG. 4, the ECM 24 may include a pre-crank control module 100, a fuel control module 102, an injector control module 104, a timed command module 106, and a starter module 108. The pre-crank control module 100 may include a pressure comparison module 110, a temperature comparison module 112, and a pre-crank dispensing module 114.

The pressure comparison module 110 may receive the pressure of the fuel in the fuel supply line 74 ($P_{supply}$) from the fuel system control module 76. Based on $P_{supply}$, the pressure comparison module may determine an estimated pressure ($P_{fuel}$) of the fuel supplied to the fuel injectors 82. The pressure comparison module 110 may also generate a pressure control signal (CS1) based on a comparison of $P_{fuel}$ and a threshold pressure value ($P_{threshold}$). The pressure comparison module 110 may generate CS1 to indicate whether $P_{fuel}$ is greater than $P_{threshold}$. The pressure comparison module 110 may output CS1 to the pre-crank dispensing module 114.

The temperature comparison module 112 may receive one or more engine signals and generate a temperature control signal (CS2) based on the signals it receives. For exemplary purposes, the temperature comparison module 112 may receive the IGN, ECT, OT, EGR, and MAF signals (FIG. 4). Based on the signals it receives, the temperature comparison module 112 may determine a temperature of the engine ($T_{eng}$) and generate CS2 by comparing $T_{eng}$ to a threshold temperature value ($T_{threshold}$). The temperature comparison module 112 may generate CS2 to indicate whether $T_{eng}$ is greater than $T_{threshold}$. The temperature comparison module 112 may output CS2 to the pre-crank dispensing module 114.

The pre-crank dispensing module 114 may receive CS1, CS2, and one or more engine and fuel system signals. Based on these signals, the pre-crank dispensing module 114 may generate a starter control signal (CS3) for controlling the starter 62 and a pre-crank fuel control signal (CS4) for controlling pre-crank operation of the fuel injectors 82. For example, the pre-crank dispensing module 114 may generate CS4 to indicate a desired quantity of fuel ($m_{fuel}$) to deliver to the engine 18 prior to cranking. The pre-crank dispensing module 114 may receive the IGN, CS1, CS2, and CPS signals for generating CS3 and CS4 (FIG. 4). The pre-crank dispensing module 114 may output CS3 to the starter module 108 and the timed command module 106. The pre-crank dispensing module 114 may output CS4 to the timed command module 106.

The pre-crank control module 100 may further include a dispensed volume determination module 116 for determining the total quantity of fuel delivered during pre-crank operation of the fuel injectors 82. The dispensed volume determination module 116 may receive a fuel system control command signal from the timed command module 106 and the pressure of the fuel in the fuel supply line 74 ($P_{supply}$) from the fuel system control module 76. Based on these signals, the dispensed volume determination module 116 may determine a total quantity of fuel ($m_{actual}$) delivered to the engine 18 prior to cranking. The dispensed volume determination module may output $m_{actual}$ to the fuel control module 102.

The fuel control module 102 may determine a desired quantity of fuel ($m_{desired}$) to deliver to the engine 18 to operate the engine 18 at a desired engine operating point (e.g., power output). The fuel control module 102 may receive the IGN signal from the ignition switch 26, $m_{actual}$ from the dispensed volume determination module 116, an air-per-cylinder (APC) value, and an air-fuel ratio (A/F) value (FIG. 4). The fuel control module 102 may determine $m_{desired}$ based on the IGN signal and the $m_{actual}$, APC, and A/F values it receives. The APC and A/F values may be determined based on the desired engine operating point. The fuel control module 102 may output $m_{desired}$ to the injector control module 104.

The injector control module 104 may receive $m_{desired}$ from the fuel control module 102 and the CPS signal from the crankshaft position sensor 50. Based on $m_{desired}$ and the CPS signal it receives, the injector control module 104 generates an injector control signal (CS5) for selectively operating the fuel injectors 82. Specifically, the injector control module 104 may determine the quantity of fuel to be delivered by the fuel injectors 82 to deliver the desired quantity of fuel ($m_{desired}$). The injector control module 104 may output CS5 to the timed command module 106.

The timed command module 106 may generate timed engine and fuel system control command signals used to operate the engine system 12 and the fuel system 20. The timed engine and fuel system control commands include, but are not limited to a commanded fuel pressure signal ($P_{command}$) for controlling the fuel system control module 76, a commanded throttle signal (THROTTLE) for controlling the throttle 36, a commanded spark signal (SPARK) for controlling the spark plugs 46, and a commanded fuel signal (FUEL) for controlling the fuel injectors 82. The timed command module 106 may generate $P_{command}$, THROTTLE, SPARK, and FUEL based on the CPS signal, CS3, CS4, CS5, $P_{desired}$, and APC.

The starter module 108 may receive CS3 from the pre-crank dispensing module 114 and the IGN signal from the ignition switch 26 and generate a starter signal (START) for selectively operating the starter 62. As discussed in more detail below, the starter module 108 may generate the starter command signal (START) to inhibit the operation of the starter 62 based on CS3.

The ignition switch 26 may be a three position switch of any known type and have "OFF", "ON", and "CRANK" positions. The Ignition switch 26 may be selectively moved between the "CRANK", "ON", and "OFF" positions to cause the ECM 24 to start, run, and stop the engine 18, respectively. The ignition switch 26 may generate the IGN signal based on a position of the ignition switch in the "OFF", "ON", or "CRANK" positions.

Figure 5:
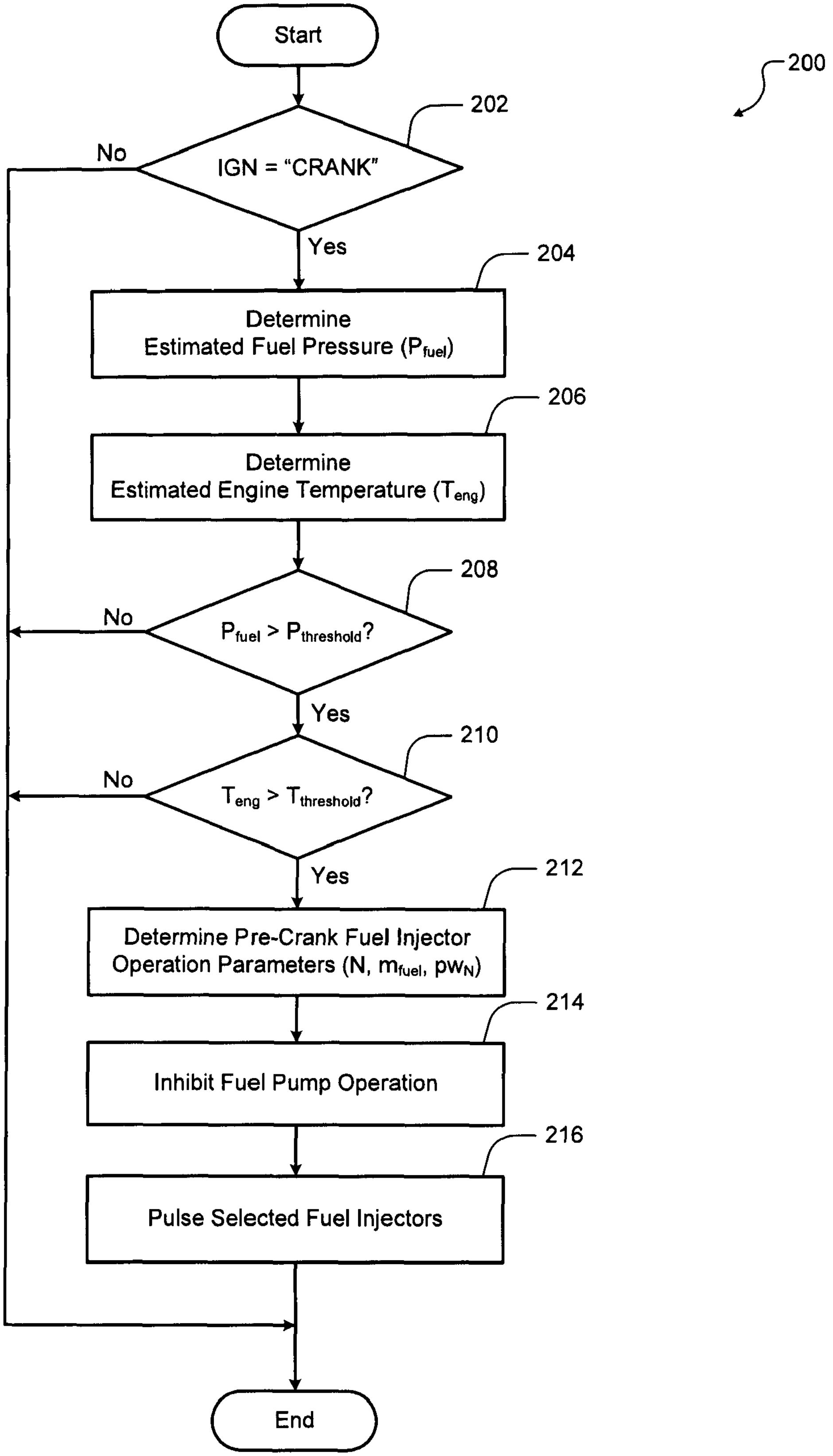
FIG. 5 is a flow diagram illustrating exemplary steps for a pre-crank, engine control method according to the principles of the present disclosure.

Referring now to FIG. 5, an exemplary pre-crank, engine control method 200 according to the present disclosure is provided and will now be described. The engine control method 200 may be implemented as a computer program stored in the memory of the ECM 24 and run every key cycle at a time when a desired set of entry conditions exist. As used herein, the term key cycle generally refers to an ignition switch cycle which begins when the ignition switch 26 moves from the OFF position into the ON or CRANK position and ends when the ignition switch 26 has moved from the ON or CRANK positions back to the OFF position.

The decision to run the engine control method 200 may be made by the ECM 24 based on the operating conditions existing on either the current key cycle or prior key cycles as will be explained in further detail below. The engine control method 200 is a pre-crank control method. Thus, the engine control method 200 may be implemented to supplement other scheduled control methods for generating timed engine and fuel system control commands during engine cranking.

The engine control method 200 may run one or more times each key cycle prior to the regular cranking operation of the engine 18. Where the control method 200 has already run during the current key cycle, control under the control method 200 may be inhibited until the engine 18 has been running for a predetermined time period. The control method 200 may be inhibited in the foregoing manner during the current key cycle and/or subsequent key cycles until the engine 18 has run for the predetermined time period. For simplicity, the engine control method 200, as discussed herein and shown in the figures, is a supplementary control method that runs once every key cycle prior to the regular cranking operation of the engine 18.

The engine control method 200 begins in step 202. In step 202, the ECM 24 determines whether a set of entry conditions are satisfied. The entry conditions will generally be satisfied at a time when the ignition switch 26 has just moved into the CRANK position from the OFF position. The entry conditions may also include whether the engine control method 200 has already run during the current key cycle and whether there are other overriding reasons to inhibit control under the engine control method 200. For example, diagnostic control methods implemented with the ECM 24 to monitor the operation of the engine and fuel systems 12, 20 may provide an overriding reason to inhibit control under the engine control method 200.

For simplicity, in step 202, the ECM 24 determines whether the ignition switch 26 has just moved into the CRANK position from the OFF position. If the ignition switch 26 has just moved into the CRANK position from the OFF position, then control proceeds in step 204, otherwise control under the engine control method 200 ends and control is transferred to other regularly scheduled engine control methods (e.g., engine cranking).

In step 204, the pressure comparison module 110 determines the estimated pressure ($P_{fuel}$) of the fuel supplied to the fuel injectors 82 based on the value of $P_{supply}$ determined by the fuel system control module 76. The estimated pressure ($P_{fuel}$) of the fuel supplied to the fuel injectors 82 may be determined in a variety of ways to account for the particular configuration of the fuel system 20. As discussed herein, the pressure comparison module 110 determines $P_{fuel}$ by equating $P_{fuel}$ to the pressure of the fuel in the fuel supply line 74 ($P_{supply}$).

Next in step 206, the temperature comparison module 112 determines the estimated temperature ($T_{eng}$) of the engine 18 based on the ECT signal generated by the coolant temperature sensor 64. The estimated engine temperature ($T_{eng}$) may be determined in a variety of ways and may represent an estimated temperature of certain components of the engine 18. For example $T_{eng}$ may be an estimated temperature of the coolant within the engine 18 or an estimated temperature of the intake valves 42. As discussed herein, $T_{eng}$ is an estimated temperature of the fuel injectors 82. More specifically, $T_{eng}$ is an estimated temperature of the spray tips of the fuel injectors 82.

To this end, the temperature comparison module 112 may implement a temperature model for determining $T_{eng}$ based on, but not limited to, engine coolant temperature (e.g., ECT signal), intake manifold air temperature (MAT), engine airflow (e.g. MAF signal), engine oil temperature (OT), and exhaust gas recirculation mass flow (EGR). Thus, the temperature comparison module 112 may determine $T_{eng}$ using a temperature model that may be generally represented by the general equation: $T_{eng}$=f(ECT, MAT, MAF, OT, and EGR).

Alternatively, the temperature comparison module 112 may look up the value of $T_{eng}$ in memory tables stored within the memory of the ECM 24, based on the foregoing engine signals. The temperature model or memory tables may be developed by empirical methods using quasi-steady-state engine testing. During such engine testing, the engine operating conditions may be varied and the resulting temperature of the fuel injectors measured. For exemplary purposes, the temperature comparison module 112 determines $T_{eng}$ in step 206 using a temperature model and the ECT, MAT, MAF, OT and EGR signals.

In step 208, the pressure comparison module 110 obtains the pressure threshold ($P_{threshold}$) value from memory and compares the value of $P_{fuel}$ determined in step 204 and $P_{threshold}$. Based on the comparison of $P_{fuel}$ and $P_{threshold}$, the pressure comparison module 110 may generate the pressure control signal (CS1) to indicate whether $P_{fuel}$ is greater than $P_{threshold}$. If $P_{fuel}$ is greater than $P_{threshold}$ then control proceeds in step 210. If $P_{fuel}$ is less than or equal to $P_{threshold}$, then control under the engine control method 200 ends.

The value of $P_{threshold}$ may generally relate to the fuel pressure above which the fuel injectors 82 may not properly open under anticipated operating conditions (e.g., $T_{eng}$ and voltage available to the fuel injectors) during subsequent engine cranking. $P_{threshold}$ may be a predetermined value based on quasi-steady-state testing of the fuel injectors 82. During such testing, fuel injector performance may be measured under varying operating conditions including fuel injector temperature, fuel pressure, voltage, and pulse width. Thus, the pressure threshold $P_{threshold}$ may be a predetermined value that is stored in memory. Alternatively, a table of values for $P_{threshold}$ may be stored in memory and $P_{threshold}$ may be looked up in the tables based on the value of $T_{eng}$ determined in step 206. For exemplary purposes, $P_{threshold}$ a predetermined value equal to about 400 kPa that is retrieved from memory in step 206.

In step 210, the temperature comparison module 112 obtains the temperature threshold ($T_{threshold}$) value from memory and compares the value of $T_{eng}$ determined in step 206 and $T_{threshold}$. Based on the comparison of $T_{eng}$ and $T_{threshold}$, the temperature comparison module 112 may generate the temperature control signal (CS2) to indicate whether $T_{eng}$ is greater than $T_{threshold}$. If $T_{eng}$ is greater than $T_{threshold}$, then control proceeds in step 212, otherwise control under the engine control method 200 ends.

The value of $T_{eng}$ obtained in step 210 may generally relate to a temperature of the engine above which the fuel injectors 82 may not properly open under the anticipated operating conditions (e.g., $P_{fuel}$ and voltage available to the fuel injectors) during subsequent engine cranking. Thus, $T_{threshold}$ may be a single predetermined value that is obtained from memory. Alternatively, $T_{threshold}$ may be obtained from a table of values stored in a memory using the value of $P_{fuel}$ determined in step 204. For exemplary purposes, $T_{threshold}$ is a predetermined value equal to about 30° C. that is retrieved from memory in step 210.

In step 212, the pre-crank dispensing module 114 determines the parameters for operating selected fuel injectors prior to cranking the engine 18. Specifically, in step 212 the pre-crank dispensing module determines a desired quantity of fuel ($m_{fuel}$) to deliver to the engine 18. The pre-crank dispensing module 114 also determines a selected number (N) of the fuel injectors 82 and corresponding pulse widths ($pw_N$) for each of the N fuel injectors 82 in order to deliver the desired quantity of fuel ($m_{fuel}$). The desired quantity of fuel ($m_{fuel}$) may generally relate to a quantity of fuel that may be dispensed prior to cranking the engine 18 to achieve a desired reduction in the pressure of the fuel supplied to the fuel injectors 82 (i.e., $P_{fuel}$). The desired quantity of fuel ($m_{fuel}$) may also relate to a quantity of fuel that may be dispensed prior to cranking the engine 18 without significantly degrading the starting performance of the engine 18.

The desired quantity of fuel ($m_{fuel}$), the selected number (N) of the fuel injectors 82, and the pulse widths ($pw_N$) may be predetermined values that are stored in memory for retrieval by the pre-crank dispensing module 114 in step 212. The values of $m_{fuel}$, N, and $pw_N$ may be predetermined based on engine development testing. For example, the number and selection of the fuel injectors (i.e., N) and the quantity of fuel delivered prior to cranking the engine (i.e., $m_{fuel}$) may be varied during engine starting testing and the resulting reduction in the pressure of the fuel supplied to the fuel injectors and engine starting performance may be measured and evaluated. Alternatively, $m_{fuel}$, N, and $pw_N$ may be determined using a simple calculation based on the estimated pressure ($P_{fuel}$) determined in step 204, the estimated engine temperature ($T_{eng}$) determined in step 206, and a voltage supplied to the injectors by the electrical system 22.

It also may be desired to determine the N fuel injectors 82 by determining which fuel injectors correspond to the cylinders that have closed intake valves at the time when control arrives in step 212. Accordingly, the N fuel injectors 82 may be determined based on positions of the intake valves 42. Specifically, the pre-crank dispensing module 114 may determine the N fuel injectors 82 to correspond to the cylinders 32 with closed intake valves 42 based on the CPS signal generated by the crankshaft position sensor 50.

The pre-crank dispensing module 114 may use the CPS signal generated at the time in which control arrives in step 212 during the current key cycle. Alternatively, the pre-crank dispensing module 114 may use a timed segment of the CPS signal stored in memory that corresponds to the time the engine 18 stopped on the last key cycle. The positions of the intake valves 42 also may be determined based on the position of the camshafts 56.

For exemplary purposes, in step 212, the pre-crank dispensing module 114 determines the N fuel injectors 82 to correspond to the cylinders 32 having intake valves 42 which are closed. Specifically, the pre-crank dispensing module 114 determines the N fuel injectors 82 by evaluating the timed segment of the CPS signal stored in memory during the last key cycle. The corresponding pulse widths ($pw_N$) for each of the N fuel injectors 82 are each predetermined values equal to about 4 milliseconds. Thus, in step 212, the pre-crank dispensing module 114 retrieves the pulse widths ($pw_N$) from memory. The pre-crank dispensing model generates CS4 to indicate the N fuel injectors 82 and the corresponding pulse widths ($pw_N$).

In step 214, the timed command module 106 generates the timed pressure command signal ($P_{command}$) to inhibit the operation of the fuel pump 78 during the pre-crank operation of the N fuel injectors 82. The timed command module 106 may generate $P_{command}$ based on the control signals CS3 and CS4 generated by the pre-crank dispensing module 114.

In step 216, the timed command module 106 generates a timed fuel system control command signal (FUEL) to selectively pulse the fuel injectors 82 based on the fuel control signal (CS4) generated by the pre-crank dispensing module 114 in step 212. Specifically, the timed command module 106 generates the FUEL signal to pulse the N fuel injectors 82 for the corresponding pulse widths ($pw_N$) to deliver the desired quantity of fuel ($m_{fuel}$) to the engine 18 prior to cranking the engine. The FUEL signal may pulse the fuel injectors 82 simultaneously, sequentially, or in a random manner. As discussed herein, the timed command module generates the FUEL signal in step 216 to pulse the fuel injectors 82 simultaneously.

Control under the engine control method 200 ends in step 216 and control is transferred to other regularly scheduled engine control methods (e.g. engine cranking) stored within the memory of the ECM 24.

In the foregoing manner, the engine control method 200 may be used to extend the dynamic flow range of the fuel injectors 82. By inhibiting the operation of the fuel pump 78 and pulsing the selected number (N) of the fuel injectors 82 prior to energizing the starter 62, the engine control method 200 uses the increased voltage that is available prior to cranking the engine 18 to operate the fuel injectors 82 at elevated fuel rail pressures. In turn, operating the fuel injectors 82 prior to cranking the engine 18 reduces the pressure of the fuel in the fuel rails 84, enabling the fuel injectors 82 to operate properly during subsequent cranking and starting of the engine 18. Depending on the quantity of fuel delivered prior to cranking the engine 18, one or more of the normally scheduled pulses of the fuel injectors 82 may be inhibited during subsequent cranking to avoid over fueling the engine 18.

Figure 6:
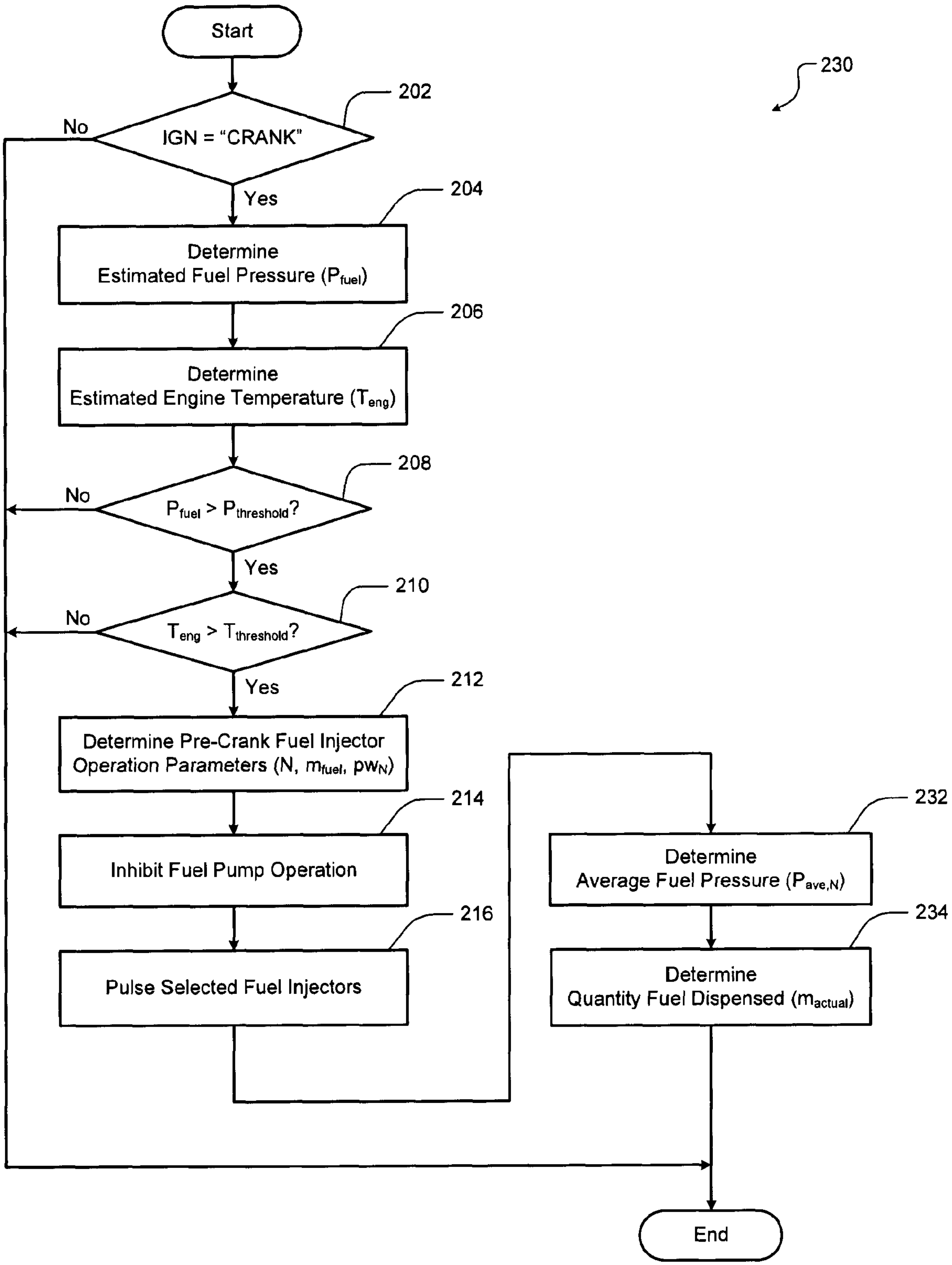
FIG. 6 is a flow diagram illustrating exemplary steps for a pre-crank, engine control method according to the principles of the present disclosure.

Referring now to FIG. 6, another engine control method 230 according to the principles of the present disclosure is provided. In view of the substantial similarity between engine control method 200 and engine control method 230, like reference numerals will be used hereinafter and in the drawings to identify like steps. New reference numerals will be introduced to identify steps that or new or have been modified. For brevity, those steps that are new or have been modified will be described in detail.

The engine control method 230 includes steps 202 through 216 of engine control method 200, along with additional steps 232 and 234. The engine control method 230 begins in step 202 and proceeds through step 216 as previously described. From step 216, control proceeds in step 232.

In step 232, the dispensed volume determination module 116 determines the average fuel pressure ($P_{ave,N}$) supplied to the N fuel injectors 82 pulsed in step 216. The dispensed volume determination module 116 may determine $P_{ave,N}$ based on $P_{supply}$ and the FUEL signal. For example, in step 232 the dispensed volume determination module 116 may determine $P_{ave,N}$ for each of the N fuel injectors 82 using the values of $P_{supply}$ generated during the operation of the fuel injectors 82 in step 216.

Since the FUEL signal generated in step 216 simultaneously pulses the fuel injectors 82, the value of $P_{ave,N}$ for each of the N fuel injectors 82 determined in step 232 may be equal. In alternative implementations of the present disclosure in which the fuel injectors are not pulsed simultaneously, $P_{ave,N}$ may vary for each of the N fuel injectors 82. The average fuel pressure ($P_{ave,N}$) may vary due to incremental reductions in the fuel pressure that may result from pulsing the N fuel injectors 82 sequentially or randomly.

In step 234, the dispensed volume determination module 116 determines an actual total quantity of fuel ($m_{actual}$) dispensed by the N fuel injectors 82 pulsed in step 216. The dispensed volume determination module 116 may determine $m_{actual}$ based on the values determined for $P_{ave,N}$ in step 232. For example, $m_{actual}$ may be calculated using the following formula: $m_{actual}=\Sigma pw_N \times C_N$, where $C_N$ represents the fuel flow capacity (e.g. lb/hr) of each of the N fuel injectors 82 at $P_{ave,N}$. It will be appreciated that the value of $m_{actual}$ determined in step 234 will generally be equal to the desired quantity of fuel ($m_{fuel}$) determined in step 212. The value of $m_{actual}$ determined in step 234 may be stored in the memory (e.g., non-volatile memory) and used by other engine control methods for cranking and starting the engine 18. As one example, the value of $m_{fuel}$ may be used to determine the desired quantity of fuel (e.g., $m_{desired}$) to deliver during subsequent cranking, starting, and operation of the engine 18 to avoid over fueling the engine 18.

Control under the engine control method 230 ends in step 234 and control is transferred to other regularly scheduled engine control methods (e.g. engine cranking) stored within the memory of the ECM 24.

In the foregoing manner, the engine control method 230 may be used to extend the dynamic flow range of the fuel injectors 82 and provide pre-crank fueling information that may be used by other scheduled engine control methods to compensate for fuel delivered to the engine prior to engine cranking.

Those skilled in the art may now appreciate from the foregoing description that the broad teachings of the present disclosure may be implemented in a variety of forms. Therefore, while this disclosure includes particular examples, the true scope of the disclosure should not be so limited, since other modifications will become apparent to the skilled practitioner upon a study of the drawings, the specification and the following claims.

What is claimed is:

1. A fuel control system comprising:

a pressure comparison module that generates a pressure control signal when a fuel supply pressure is greater than a predetermined pressure value;

a temperature comparison module that generates a temperature control signal when a temperature of an engine is greater than a predetermined temperature value; and a pre-crank fuel module that selectively dispenses pre-crank fuel prior to cranking said engine based on said pressure control signal and said temperature control signal.

2. The fuel control system of claim 1 further comprising a fuel pump, wherein said pre-crank fuel module disables operation of said fuel pump while said pre-crank fuel is dispensed.

3. The fuel control system of claim 1, wherein said pre-crank fuel module determines a desired quantity of said pre-crank fuel to dispense based on at least one of said fuel supply pressure and said temperature.

4. The fuel control system of claim 1 further comprising a fuel injector for dispensing said pre-crank fuel, wherein said temperature is an estimated temperature of said fuel injector.

5. The fuel control system of claim 4, wherein at least one of said predetermined pressure value and said predetermined temperature value is based on a voltage supplied to said fuel injector.

6. The fuel control system of claim 4 further comprising a volume determination module that determines an actual quantity of said pre-crank fuel dispensed by said fuel injector.

7. The fuel control system of claim 1 further comprising a plurality of fuel injectors for dispensing fuel to a plurality of cylinders of said engine, wherein at least one of said plurality of fuel injectors dispenses said pre-crank fuel.

8. The fuel control system of claim 7, wherein said pre-crank fuel module pulses a selected number (N) of said plurality of fuel injectors to dispense said pre-crank fuel based on positions of a corresponding plurality of intake valves of said engine, where N is an integer greater than zero.

9. The fuel control system of claim 8 wherein said selected number (N) of said plurality of fuel injectors corresponds to closed positions of said plurality of intake valves.

10. The fuel control system of claim 8, wherein said selected number (N) of said plurality of fuel injectors are simultaneously pulsed to dispense said pre-crank fuel.

11. A method of fuel control comprising:

comparing a fuel supply pressure and a predetermined pressure value;

comparing a temperature of an engine and a predetermined temperature value; and dispensing a quantity of pre-crank fuel prior to cranking said engine based on said pressure comparison and said temperature comparison.

12. The method of claim 11 further comprising disabling operation of a fuel pump of said engine during said dispensing said quantity of pre-crank fuel.

13. The method of claim 11 further comprising determining said quantity of pre-crank fuel based on at least one of said fuel supply pressure and said temperature.

14. The method of claim 11, wherein said temperature is an estimated temperature of a fuel injector of said engine.

15. The method of claim 11 further comprising determining at least one of said predetermined pressure value and said predetermined temperature value based on a voltage supplied to a fuel injector of said engine.

16. A method of fueling an engine comprising:

providing a plurality of fuel injectors for dispensing fuel to said engine;

comparing a pressure of said fuel and a predetermined pressure value;

comparing a temperature of said engine and a predetermined temperature value;

selecting a number (N) of said plurality of fuel injectors based on positions of a plurality of intake valves of said engine, where N is an integer greater than zero; and pulsing said N fuel injectors to dispense a quantity of pre-crank fuel prior to cranking said engine based on said pressure comparison and said temperature comparison.

17. The method of claim 16, wherein said number (N) corresponds to closed positions of said intake valves.

* * * * *